United States Patent
Cai et al.

(10) Patent No.: US 11,184,866 B2
(45) Date of Patent: Nov. 23, 2021

(54) BEAM SELECTION BALANCING MAXIMUM POWER EXPOSURE AND LINK BUDGET

(71) Applicant: QUALCOMM Incorporated, San Diego, CA (US)

(72) Inventors: Mingming Cai, San Jose, CA (US); Tienyow Liu, Santa Clara, CA (US); Raghu Narayan Challa, San Diego, CA (US); Jing Lin, Milpitas, CA (US); Junsheng Han, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/860,271

(22) Filed: Apr. 28, 2020

(65) Prior Publication Data

US 2020/0374818 A1  Nov. 26, 2020

Related U.S. Application Data

(60) Provisional application No. 62/852,772, filed on May 24, 2019.

(51) Int. Cl.
| | |
|---|---|
| *H04W 52/42* | (2009.01) |
| *H04B 7/06* | (2006.01) |
| *H04W 52/14* | (2009.01) |
| *H04W 52/22* | (2009.01) |
| *H04W 52/36* | (2009.01) |
| *H04W 88/02* | (2009.01) |

(52) U.S. Cl.
CPC .......... *H04W 52/42* (2013.01); *H04B 7/0695* (2013.01); *H04W 52/146* (2013.01); *H04W 52/228* (2013.01); *H04W 52/367* (2013.01); *H04W 88/02* (2013.01)

(58) Field of Classification Search
CPC .. H04B 7/0695; H04W 52/42; H04W 52/228; H04W 52/146
USPC ............ 455/522, 69, 67.11, 66.1, 277.1, 275
See application file for complete search history.

(56) References Cited

U.S. PATENT DOCUMENTS

| | | | |
|---|---|---|---|
| 2015/0009984 A1* | 1/2015 | Jung | H04W 56/0055 370/350 |
| 2018/0167897 A1* | 6/2018 | Sampath | H04W 52/365 |
| 2020/0145079 A1* | 5/2020 | Marinier | H04B 7/0456 |

FOREIGN PATENT DOCUMENTS

WO    2017196612 A1    11/2017

OTHER PUBLICATIONS

International Search Report and Written Opinion—PCT/US2020/030453—ISA/EPO—dated Jun. 30, 2020.
International Search Report and Written Opinion—PCT/US2020/030453—ISA/EPO—dated Apr. 12, 2021.

* cited by examiner

*Primary Examiner* — John J Lee
(74) *Attorney, Agent, or Firm* — Patterson+ Sheridan, L.L.P.

(57) ABSTRACT

Certain aspects of the present disclosure relate to beam selection. An example method generally includes selecting, from a plurality of beams, a beam for uplink transmission during a particular time interval, the selecting being based on a transmission power and a radio frequency (RF) exposure for each of the plurality of beams and transmitting at least one uplink signal using the selected beam during the particular time interval.

18 Claims, 7 Drawing Sheets

BEAM SELECTION BALANCING MAXIMUM POWER EXPOSURE AND LINK BUDGET

CROSS-REFERENCE TO RELATED APPLICATION

This application claims benefit of and priority to U.S. Provisional Application No. 62/852,772, filed May 24, 2019, which is hereby assigned to the assignee hereof and hereby expressly incorporated by reference herein in its entirety.

BACKGROUND

Field of the Disclosure

Aspects of the present disclosure relate to wireless communications, and more particularly, to techniques for beam selection that takes into account the maximum transmit power level available at multiple antenna modules based on a radio frequency (RF) exposure limit.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable uplink beam selection for wireless communications.

Certain aspects provide a method for wireless communication. The method generally includes selecting, from a plurality of beams, a beam for uplink transmission during a particular time interval, the selecting being based on a transmission power and a radio frequency (RF) exposure for each of the plurality of beams and transmitting at least one uplink signal using the selected beam during the particular time interval.

Certain aspects provide an apparatus for wireless communication. The apparatus generally includes a processing system and a transmitter. The processing system is configured to select, from a plurality of beams, a beam for uplink transmission during a particular time interval, the selecting being based on a transmission power and an RF exposure for each of the plurality of beams. The transmitter is configured to transmit at least one uplink signal using the selected beam during the particular time interval.

Certain aspects provide an apparatus for wireless communication. The apparatus generally includes means for selecting, from a plurality of beams, a beam for uplink transmission during a particular time interval, the selecting being based on a transmission power and an RF exposure for each of the plurality of beams and means for transmitting at least one uplink signal using the selected beam during the particular time interval.

Certain aspects provide a non-transitory computer-readable medium. The computer-readable medium generally includes instructions thereon for selecting, from a plurality of beams, a beam for uplink transmission during a particular time interval, the selecting being based on a transmission power and an RF exposure for each of the plurality of beams and transmitting at least one uplink signal using the selected beam during the particular time interval.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer-readable mediums for a selecting an uplink transmission beam based on RF exposure limits encountered at multiple antenna modules, antenna arrays, or a combination of antenna array elements. For example, a user equipment may select an uplink beam for transmission corresponding to the antenna module that has the highest maximum allowed transmission power in accordance with the time-averaged RF exposure limits for each of the antenna modules.

Figure 1:
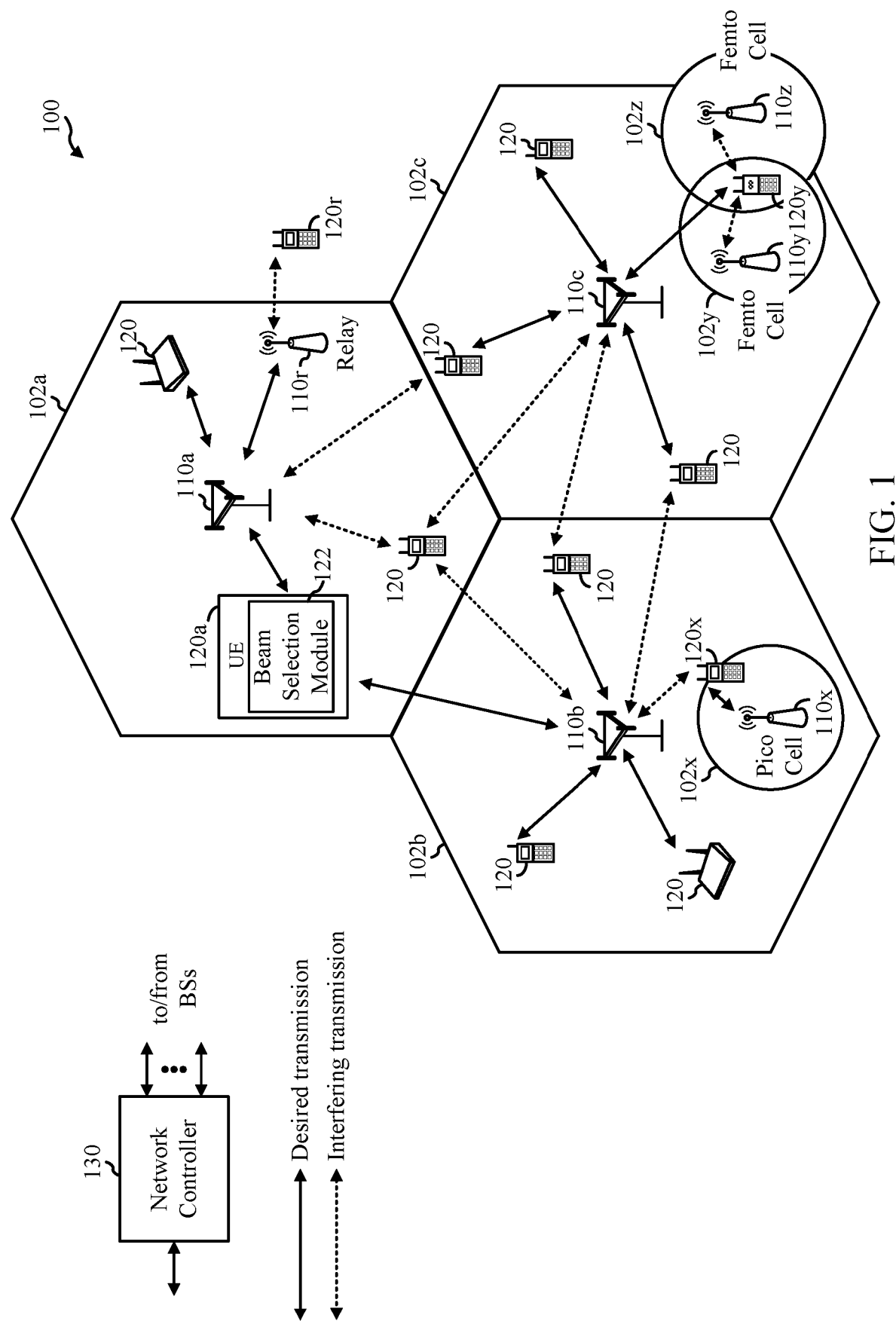
FIG. 1 is a block diagram conceptually illustrating an example telecommunications system, in accordance with certain aspects of the present disclosure.

FIG. 1 illustrates an example wireless communication network 100 in which aspects of the present disclosure may be performed. The wireless communication network 100 may be an NR system (e.g., a 5G NR network). In certain cases, as shown in FIG. 1, the UE 120a has a beam selection module 122 that may be configured for selecting a transmission beam based on a transmission power and a radio frequency (RF) exposure for each of a plurality of beams, according to aspects described herein.

NR is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmWave) targeting high carrier frequency (e.g., 25 GHz or beyond, 24.25 GHz to 52.6 GHz or beyond), massive machine type communications MTC (mMTC) targeting non-backward compatible MTC techniques, and/or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

As illustrated in FIG. 1, the wireless communication network 100 may include a number of base stations (BSs) 110 and other network entities. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells. Wireless communication network 100 may also include relay stations. In the example shown in FIG. 1, a relay station 110r may communicate with the BS 110a and a UE 120r in order to facilitate communication between the BS 110a and the UE 120r. A relay station may also be referred to as a relay BS, a relay, etc.

The UEs 120 (e.g., 120x, 120y, etc.) may be dispersed throughout the wireless communication network 100, and each UE may be stationary or mobile. In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

Figure 2:
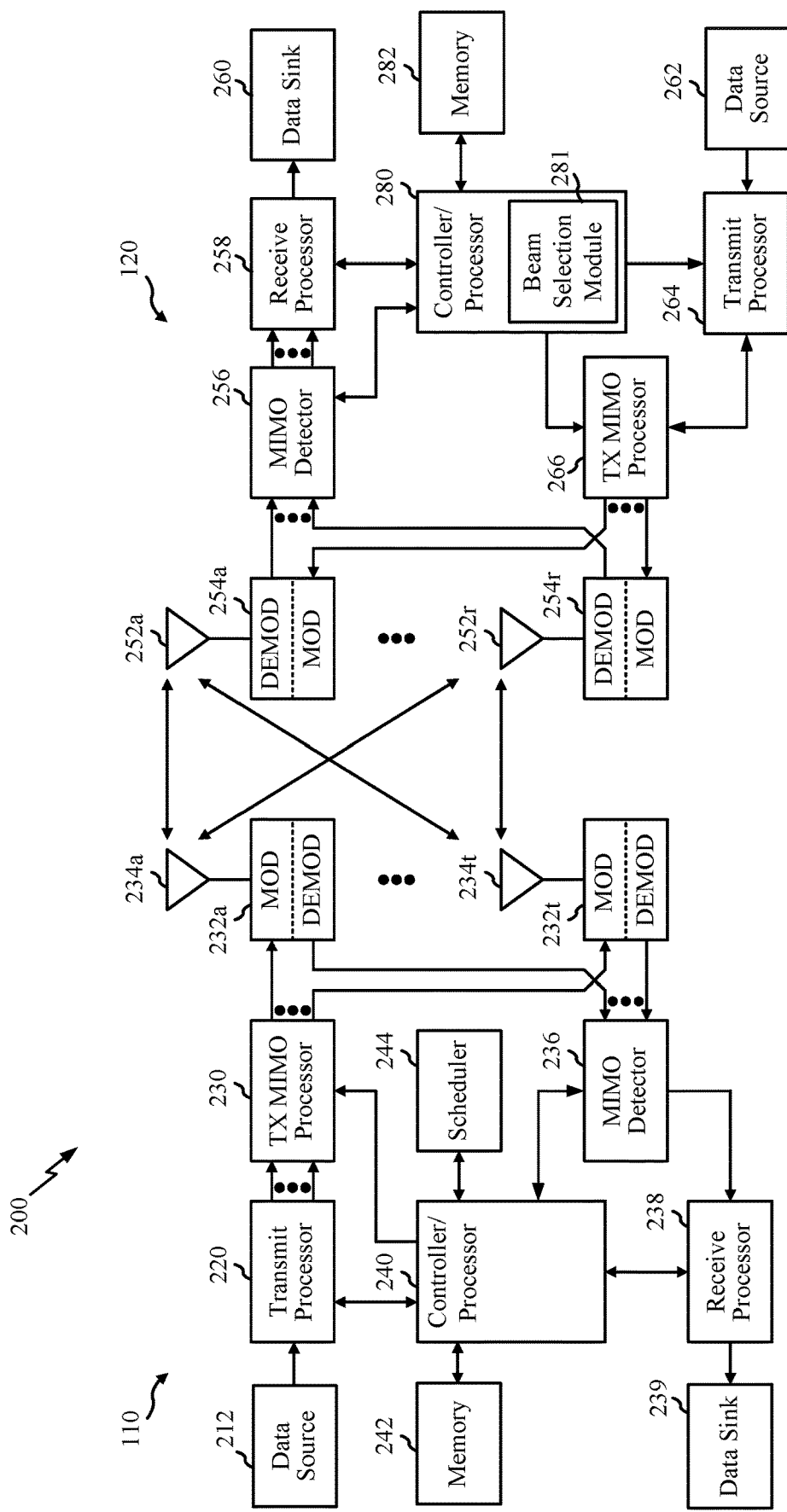
FIG. 2 is a block diagram conceptually illustrating a design of an example base station (BS) and user equipment (UE), in accordance with certain aspects of the present disclosure.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 2, the controller/processor 280 of the UE 120 has a beam selection module 281 that may be configured for selecting a transmission beam based on a transmission power and a radio frequency (RF) exposure for each of a plurality of beams, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Example Beam Selection Balancing Maximum Power Exposure and Link Budget

For certain wireless communication technologies (such as 5G mmWave communications), a beam selection mechanism is a critical component for a UE to achieve suitable link performance with a BS. In certain cases, only link budget parameters, such as downlink (DL) reference signal received power (RSRP), may be used as a UE beam selection metric. The problem of using only DL RSRP as beam selection metric is that the selected beam with the strongest DL RSRP may not be able to transmit at the highest power level in the uplink (UL) relative to other beams due to constraints associated with radio frequency (RF) exposure on human tissue. As such, using only link budget factors to select an uplink beam may severely hinder uplink transmission performance and capacity.

Modern wireless communications devices (such as a UE) are generally required to satisfy a maximum permissible exposure (MPE) limit that provides the maximum RF exposure that human tissue may absorb from a wireless communication device as set by domestic and international standards and regulations, such as the International Commission on Non-Ionizing Radiation Protection (ICNIRP) and Federal Communications Commission (FCC) in the United States. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of $mW/cm^2$.

To ensure that a wireless communication device complies with the MPE, techniques have been developed to enable the wireless communication device to assess RF exposure from the wireless communication device in real time and adjust the transmission power of the wireless device accordingly to comply with the MPE. The MPE can be translated to the maximum transmission power limit of the UE. Therefore, a UE may not freely transmit at high power levels to provide desirable UL link performance without taking into consideration the MPE.

Certain aspects of the present disclosure relate to uplink beam selection that takes into account the MPE limitations encountered by the antenna elements of the UE. For example, the beam selection techniques described herein may remove the possibility that beam management always selects a beam for uplink transmissions with the strongest DL RSRP while the allowed UL power for the beam may be limited by MPE. Also, the beam selection techniques described herein may take into account MPE detection results to properly scale the actual RF exposure measured (e.g., SAR and/or PD) based on the proximity of objects to the respective antenna modules. In aspects, the beam selection techniques described herein may enable a UE to transmit via a beam at a desirable transmit power and/or RF exposure, which, in turn, may provide desirable UL performance (e.g., signal-to-noise ratio (SNR), block error rate (BLER), data rate, latency, etc.).

Figure 3:
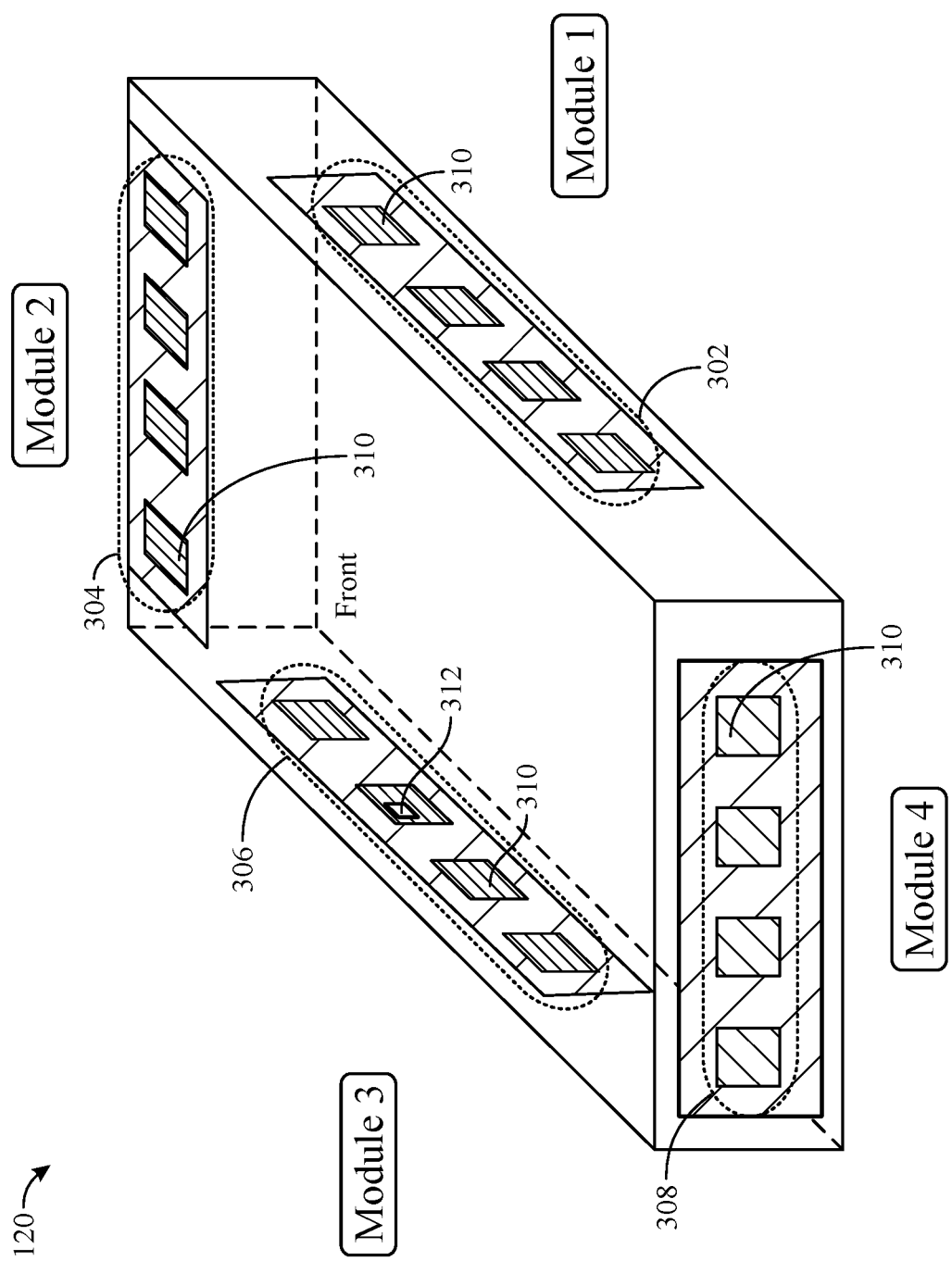
FIG. 3 is an isometric view of multiple antenna modules disposed on a UE, in accordance with certain aspects of the present disclosure.

In 5G mmWave beamforming applications, the UE may have multiple antenna modules disposed at different locations on the UE, for example, to provide spatial diversity for communication links. FIG. 3 illustrates an isometric view of multiple antenna modules disposed on a UE, in accordance with certain aspects of the present disclosure. As shown, the UE 120 may have multiple antenna modules including a first antenna module 302, a second antenna module 304, a third antenna module 306, and a fourth antenna module 308, each of which is positioned at a different location on the UE 120. Each of the antenna modules 302, 304, 306, 308 may include one or more antenna arrays 310, which may include one or more antenna array elements 312. In aspects, each of the antenna modules 302, 304, 306, 308 may enable beamformed signals to be transmitted or received by the UE 120.

In certain cases, one antenna module (e.g., the first antenna module 302) may have a stronger DL RSRP than the other antenna modules, but that antenna module (e.g., the first antenna module 302) may be MPE limited on uplink transmissions, for example, due to the detection of an object (e.g., human tissue) being in close proximity to the antenna module. In this situation, another antenna module with a lower MPE limitation may provide a better UL beam candidate for transmissions to the BS at high power levels. The UE may select the antenna module for uplink transmissions that exhibits a lower MPE limitation (among other factors), which corresponds to a higher transmit power available for uplink transmissions.

In certain aspects, a UE may use an RF exposure calculator (e.g., specific absorption rate calculator (SARC) or a power density calculator (PDC)) combined with object distance sensors that determine the MPE limit for each antenna module and compute the available power to transmit in the next update interval (T2) in a moving time window (window size: T1) manner. The moving time window T1 may be a predetermined time window in a range from 1 second to 360 seconds. The next update interval T2 may be in a range from 1 millisecond to 5 seconds.

Figure 4:
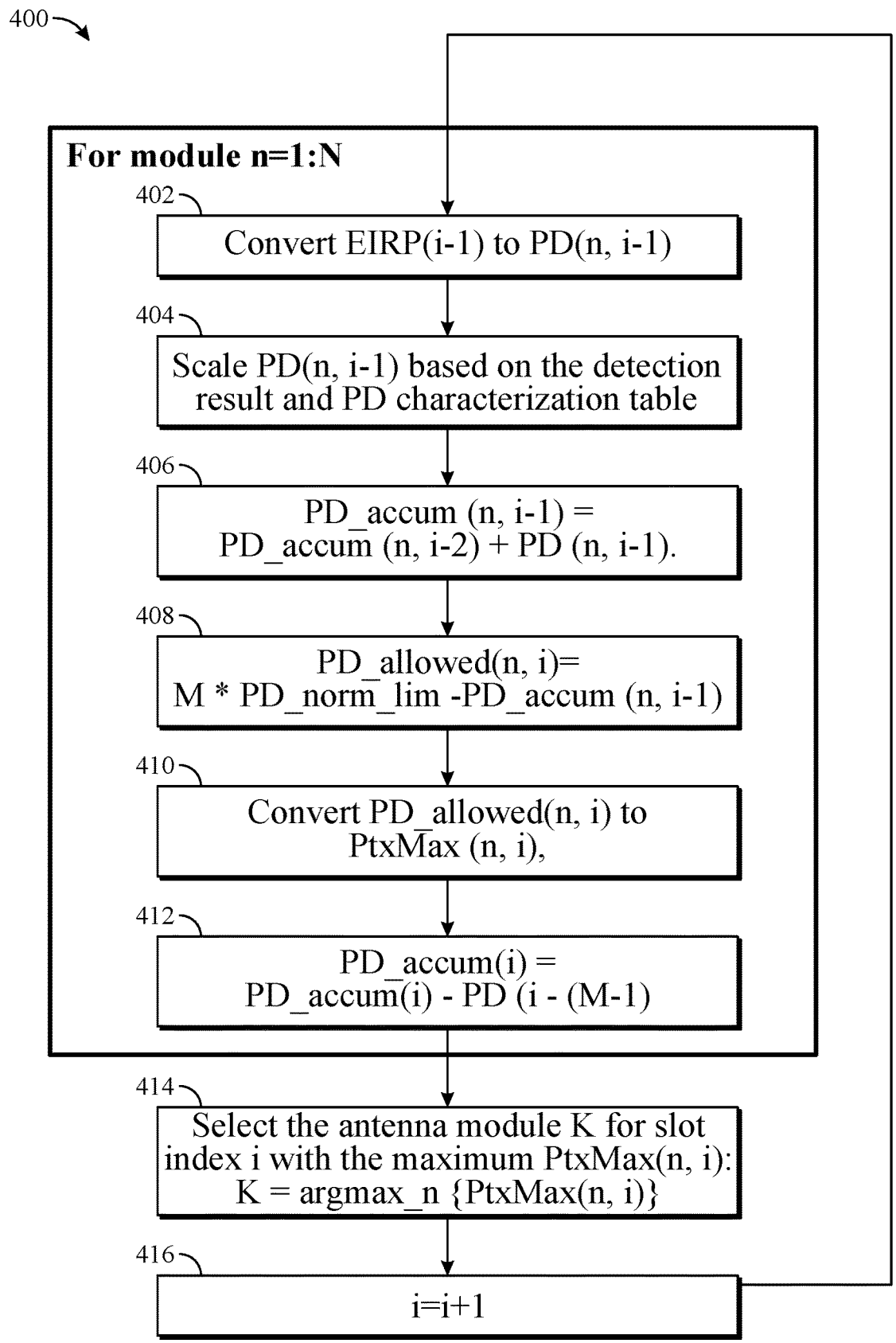
FIG. 4 is a flow diagram illustrating example operations for beam selection, in accordance with certain aspects of the present disclosure.

FIG. 4 is a flow diagram illustrating example operations 400 for beam selection that takes into account the MPE limitations of antenna modules, in accordance with certain aspects of the present disclosure. The operations 400 may be performed, for example, by a UE (e.g., such as a UE 120 in the wireless communication network 100). The PDC and beam selection techniques described herein may be implemented as software components that are executed and run on one or more processors (e.g., controller/processor 280 of FIG. 2).

The operations 400 may begin, at block 402, where the PDC of each antenna module may use the required effective isotopic radiated powers (EIRPs) from the previous M-1 (where M=T1/T2) T2 intervals to determine a time-averaged RF exposure model across T1 that provides available transmit power for the future time interval i. Although the actual transmission of each update interval may only be from one antenna module, the PDC may take the requested transmitted EIRP(i-1) from the previous transmission intervals i-1 and convert the EIRP(i-1) to a transmit power Ptx(n, i-1) for the antenna module n. Then, the PDC may convert the transmit power Ptx(n, i-1) to a power density PD(n, i-1), for example, based on a PD to transmit power mapping table also known as a PD Characterization Table.

At block 404, the PDC may take MPE detection results of each antenna module (such as a blocking object distance detection from the antenna module) to discount the PD(n, i-1) determined at block 402. The reason is that the actual PD measured on the surface of an object may be scaled down if the blocking object is at a farther distance from the antenna surface. This allows the PD of an antenna module with a greater distance from blocking objects to decrease.

At block 406, the PDC may accumulate the PD(n, i-1) with previously used accumulated PD_accum(n, i-2), e.g., PD_accum(n, i-1)=PD_accum(n, i-2)+PD(n, i-1). That is, the PDC may determine the sum of the PDs of the previous transmission intervals from the previous M-1 T2 intervals.

At block 408, the PDC may compute the allowed PD for the update interval i as PD_allowed(n, i)=M * PD_norm_lim-PD_accum(n, i-1), where PD_norm_lim is the normalized PD limit. A PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one.

At block 410, based on the PD characterization table, the PDC may convert the allowed PD for the update interval PD_allowed(n, i) to a transmission power PtxMax(n, i), e.g., the maximum allowed transmission power of antenna module n for update interval i.

At block 412, the PDC may remove the last transmission interval (M-1) from the accumulated PD sum, e.g., PD_accum(n, i-1)=PD_accum(n, i-1)-PD(n, i-(M-1)). The reason to subtract PD(i-(M-1)) is the PD at the M-1 interval before interval i will be out of the next averaging window T1, and the M-1 will not be counted as the total PD used for the next update interval.

At block 414, the beam selection for next update internal index i may be conducted by selecting the antenna module which has the highest maximum transmit power available for the next transmission interval PtxMax(n, i) among all or some of the antenna modules.

At block 416, the PDC may repeat the above procedures for the next transmission interval.

Although the present disclosure describes the beam selection at the antenna module level, the techniques described herein may also apply to beam selection on an antenna array or antenna array element basis. For example, the UE may perform operations 400 to determine the maximum allowed transmit power for each antenna array or antenna array element and select the beam for uplink transmissions by selecting the antenna array or antenna array element which has the highest maximum transmit power available for the next transmission interval.

Further, although the beam selection techniques described herein may be described in terms of power density, the techniques described herein may also apply to beam selection based on SAR limits or a combination of SAR and PD limits.

Figure 5:
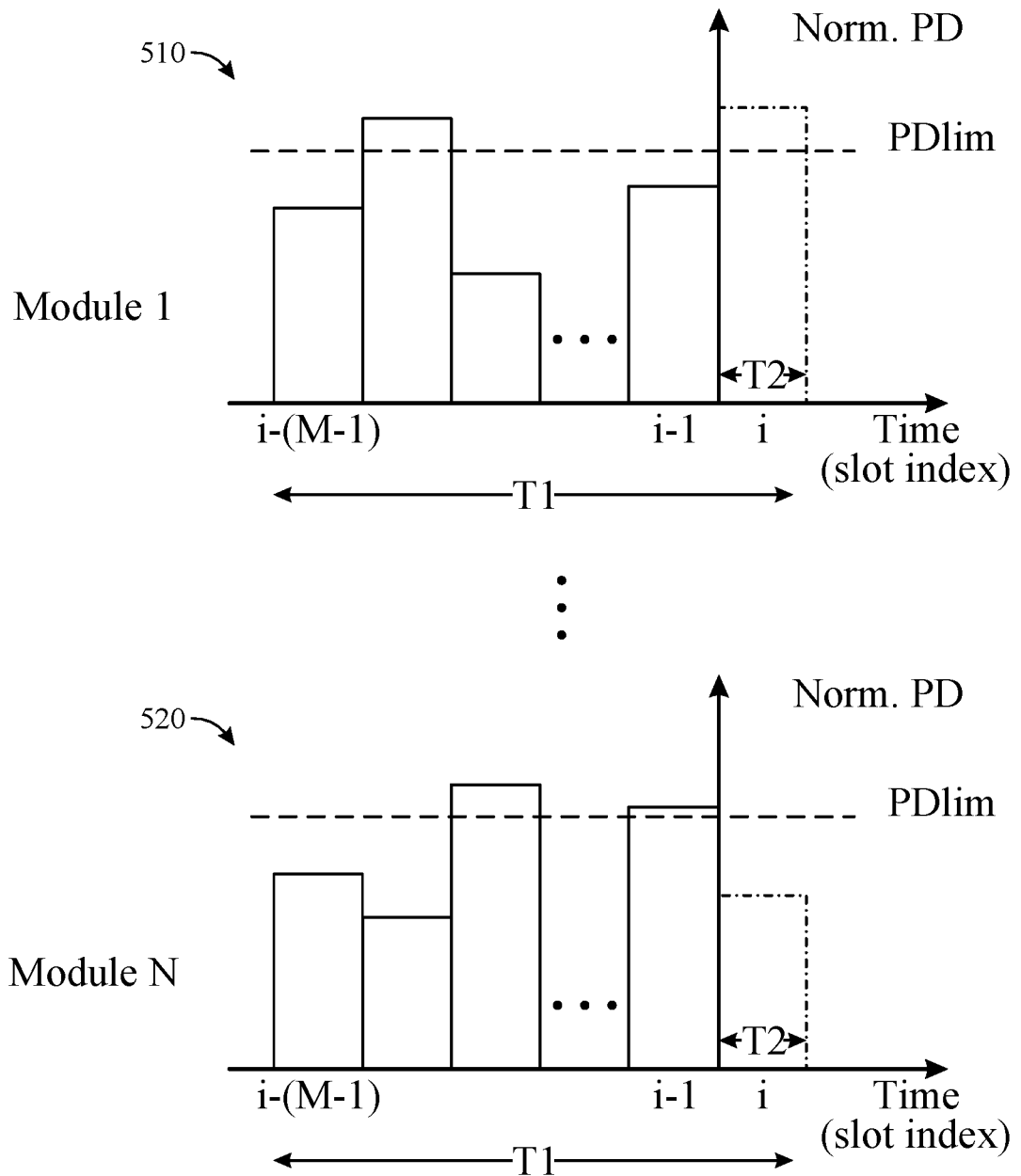
FIG. 5 illustrates example transmission powers for multiple antenna modules over a time-averaged RF exposure time window, in accordance with certain aspects of the present disclosure.

FIG. 5 illustrates RF exposures (which correspond to transmission powers, in some cases via a scaling factor) over a monitoring time T1 for various antenna modules 1-N, in accordance with certain aspects of the present disclosure. The graph 510 depicts the RF exposure PD values for antenna module 1 across T1, and the graph 520 depicts the RF exposure PD values for antenna module N. As described herein with respect to FIG. 4, the PDC may determine the future allowed PD value at update interval i across the period T2 using a normalized time-average. In certain cases, the PDC may determine the previous PD values based on a conversion model or scaling factor between PD and transmit power. As shown, the UE may select antenna module 1 for uplink transmissions because antenna module 1 has a greater allowed transmit power for the future transmission interval i than the antenna module N despite any DL RSRP values measured at the antenna modules. The selection of antenna module 1 may enable the UE to transmit signals with a desirable transmit power, which, in turn, may result in desirable UL performance.

Figure 6:
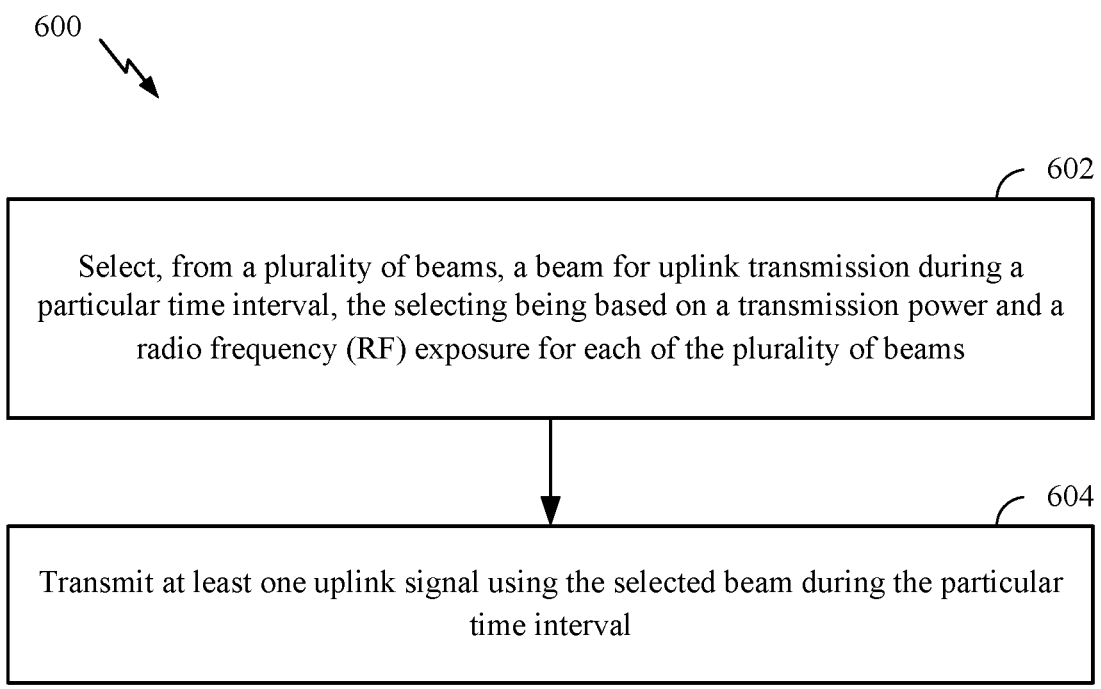
FIG. 6 is a flow diagram illustrating other example operations for beam selection, in accordance with certain aspects of the present disclosure.

FIG. 6 is a flow diagram illustrating example operations 600 for beam selection, in accordance with certain aspects of the present disclosure. The operations 600 may be performed, for example, by a UE (e.g., such as a UE 120 in the wireless communication network 100). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 602, by the UE selecting, from a plurality of beams, a beam for uplink transmission during a particular time interval (e.g., T2 at update interval i of FIG. 5), the selecting being based on a transmission power and a radio frequency (RF) exposure for each of the plurality of beams. At block 604 the UE may transmit at least one uplink signal using the selected beam during the particular time interval.

In certain aspects, the operations 600 may further include the UE repeating, for a subsequent interval after the particular time interval, the selection of the beam for uplink transmission during the subsequent time interval and the transmission of at least another uplink signal using the selected beam during the subsequent time interval.

In aspects, the plurality of beams may include a plurality of antenna modules, antenna arrays, or antenna array elements of the UE, for example, as described herein with respect to FIG. 3. The plurality of beams may correspond to transmission beams that may be beamformed from the antenna modules, antenna arrays, or antenna array elements of the UE. The selecting at block 604 may include selecting one of the plurality of antenna modules, antenna arrays, or antenna array elements for the uplink transmission. In aspects, the plurality of beams may include a plurality of combinations of antenna array elements of the UE and the selecting may include selecting one of the combinations of the antenna array elements for the uplink transmission.

The particular time interval may be part of a moving time window (e.g., T1 of FIG. 5). The selecting at block 604 may be based on the transmission power of previous time intervals (e.g., time intervals (i-1) through (i-(M-1)) of FIG. 5) in the time window and the RF exposure, for each of the plurality of beams, for a prior time interval in the time window.

The transmission power of the previous time intervals may include an effective isotropic radiated power (EIRP) of the previous time intervals in the time window. For example, the UE may convert the EIRP of the previous time intervals into an RF exposure metric such as PD or SAR as described herein with respect to FIG. 4.

The moving time window (e.g., T1) may be a predetermined time window in a range from 1 second to 360 seconds, and the particular time interval (e.g., T2 at update interval i) may be in a range from 1 milliseconds to 5 seconds. For example, T1 may equal 100 s, and T2 may equal 5 s, in which case M=20.

The operations 600 may further include the UE converting the transmission power for the prior time interval to a used RF exposure for the prior time interval for each of the plurality of beams as described herein with respect to block 402 of FIG. 4. The UE may detect an indication of the RF exposure for each of the plurality of beams as described herein with respect to block 404 of FIG. 4. The UE may scale the used RF exposure for the prior time interval for each of the plurality of beams using the detected indication of the RF exposure for each of the plurality of beams as described herein with respect to block 404 of FIG. 4. The UE may add the scaled RF exposure for the prior time interval for each of the plurality of beams to an accumulated RF exposure value for the time window for each of the plurality of beams to generate an accumulated sum for each of the plurality of beams as described herein with respect to block 406 of FIG. 4. The UE may calculate a maximum allowed transmission power for the particular time interval for each of the plurality of beams based on the accumulated sum for each of the plurality of beams and a maximum RF exposure limit as described herein with respect to block 408 of FIG. 4. The UE may select the beam out of the plurality of the beams having the highest maximum allowed transmission power for the particular time interval as the beam for uplink transmission during the particular time interval as described herein with respect to block 414 of FIG. 4.

The RF exposure with respect to operations 600 may include a specific absorption rate (SAR) or a power density (PD).

Figure 7:
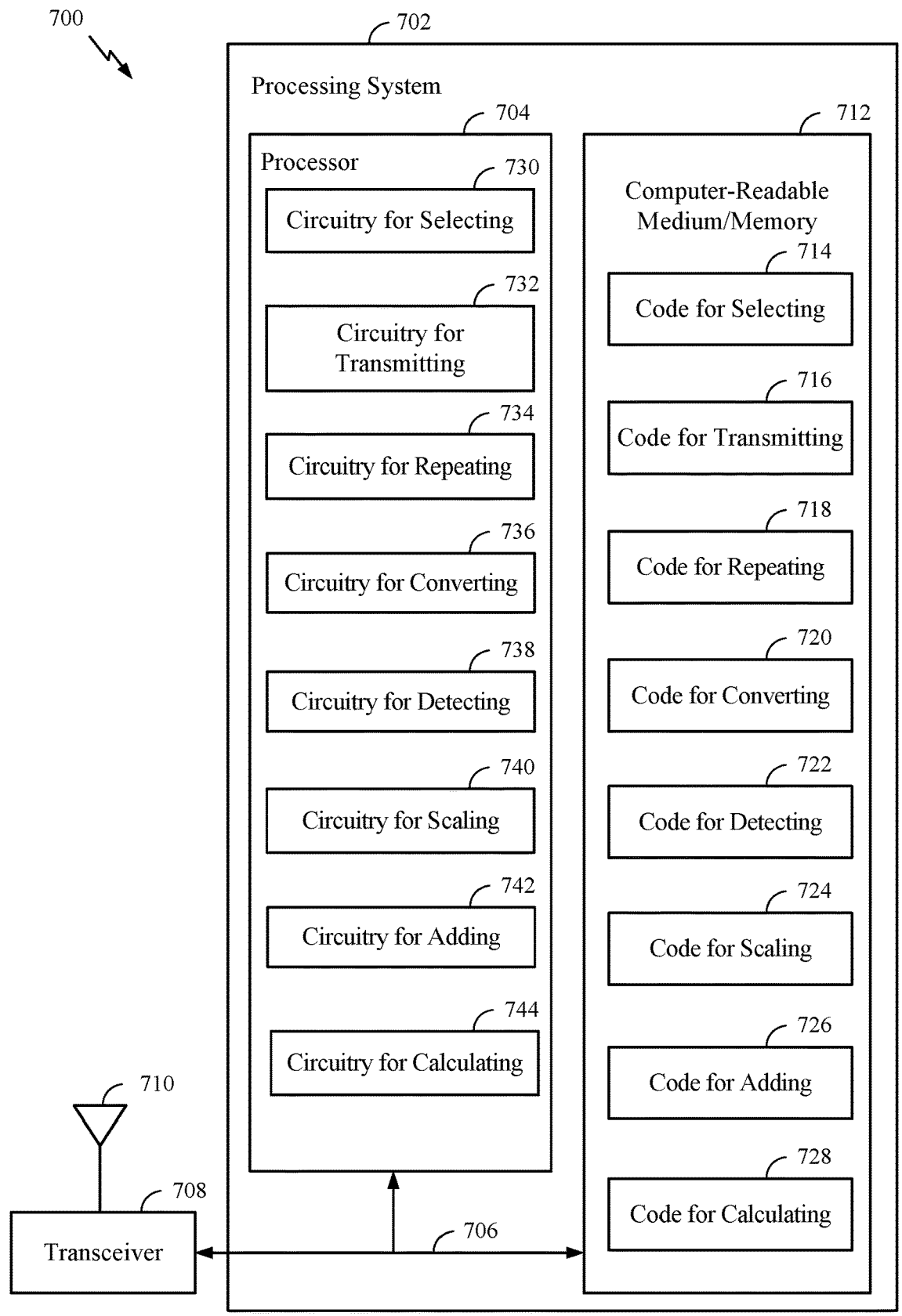
FIG. 7 illustrates a communications device that may include various components configured to perform operations for the techniques disclosed herein in accordance with aspects of the present disclosure.

FIG. 7 illustrates a communications device 700 (e.g., the UE 120) that may include various components (e.g., corresponding to means-plus-function components) configured to perform operations for the techniques disclosed herein, such as the operations illustrated in FIGS. 4 and 6. The communications device 700 includes a processing system 702 coupled to a transceiver 708. The transceiver 708 is configured to transmit and receive signals for the communications device 700 via an antenna 710, such as the various signals as described herein. The transceiver 708 may include a transmitter and receiver. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIGS. 4 and 6, or other operations for performing the various techniques discussed herein. In certain aspects, computer-readable medium/memory 712 stores code for selecting 714, code for transmitting 716, cod for repeating 718, code for converting 720, code for detecting 722, code for scaling 724, code for adding 726, and/or code for calculating 728. In certain aspects, the processor 704 has circuitry configured to implement the code stored in the computer-readable medium/memory 712. The processor 704 may include circuitry for selecting 730, circuitry for transmitting 732, circuitry for repeating 734, circuitry for converting 736, circuitry for detecting 738, circuitry for scaling 740, circuitry for adding 742, and/or circuitry for calculating 744.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A, and GSM are described in documents from an organization named "3rd Generation Partnership Project" (3GPP). cdma2000 and UMB are described in documents from an organization named "3rd Generation Partnership Project 2" (3 GPP2).

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

A BS may be a station that communicates with user equipment (UEs). Each BS may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes in a wireless communication network through various types of backhaul interfaces, such as a direct physical connection, a wireless connection, a virtual network, or the like using any suitable transport network.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A wireless communication network may be a heterogeneous network that includes BSs of different types, e.g., macro BS, pico BS, femto BS, relays, etc. These different types of BSs may have different transmit power levels, different coverage areas, and different impact on interference in the wireless communication network. For example, macro BS may have a high transmit power level (e.g., 20 Watts) whereas pico BS, femto BS, and relays may have a lower transmit power level (e.g., 1 Watt).

A wireless communication network may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10, or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 kHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:
    selecting, from a plurality of beams, a beam for uplink transmission during a particular time interval, the selecting being based on a transmission power and a radio frequency (RF) exposure for each of the plurality of beams, wherein the particular time interval is part of a moving time window and wherein the selecting is based on the transmission power of previous time intervals in the time window and the RF exposure, for each of the plurality of beams, for a prior time interval in the time window; and
    transmitting at least one uplink signal using the selected beam during the particular time interval.

2. The method of claim 1, further comprising repeating, for a subsequent interval after the particular time interval, the selection of the beam for uplink transmission during the subsequent time interval and the transmission of at least another uplink signal using the selected beam during the subsequent time interval.

3. The method of claim 1, wherein the plurality of beams comprises a plurality of antenna modules of the UE and wherein the selecting comprises selecting one of the plurality of antenna modules for the uplink transmission.

4. The method of claim 1, wherein the transmission power of the previous time intervals comprises an effective isotropic radiated power (EIRP) of the previous time intervals in the time window.

5. The method of claim 1, wherein the moving time window is a predetermined time window in a range from 1 second to 360 seconds and wherein the particular time interval is in a range from 1 millisecond to 5 seconds.

6. The method of claim 1, wherein the selecting comprises:
    converting the transmission power for the prior time interval to a used RF exposure for the prior time interval for each of the plurality of beams;
    detecting an indication of the RF exposure for each of the plurality of beams;
    scaling the used RF exposure for the prior time interval for each of the plurality of beams using the detected indication of the RF exposure for each of the plurality of beams;
    adding the scaled RF exposure for the prior time interval for each of the plurality of beams to an accumulated RF exposure value for the time window for each of the plurality of beams to generate an accumulated sum for each of the plurality of beams;
    calculating a maximum allowed transmission power for the particular time interval for each of the plurality of beams based on the accumulated sum for each of the plurality of beams and a maximum RF exposure limit; and
    selecting the beam out of the plurality of the beams having the highest maximum allowed transmission power for the particular time interval as the beam for uplink transmission during the particular time interval.

7. The method of claim 1, wherein the RF exposure comprises a specific absorption rate (SAR) or a power density (PD).

8. The method of claim 1, wherein the plurality of beams comprises a plurality of combinations of antenna array elements of the UE and wherein the selecting comprises selecting one of the combinations of the antenna array elements for the uplink transmission.

9. An apparatus for wireless communication, comprising:
    a processing system configured to select, from a plurality of beams, a beam for uplink transmission during a particular time interval, the selecting being based on a transmission power and a radio frequency (RF) exposure for each of the plurality of beams, wherein the particular time interval is part of a moving time window and wherein the processing system is configured to select the beam based on the transmission power of previous time intervals in the time window and the RF exposure, for each of the plurality of beams, for a prior time interval in the time window; and
    a transmitter configured to transmit at least one uplink signal using the selected beam during the particular time interval.

10. The apparatus of claim 9, wherein, for a subsequent interval after the particular time interval:
    the processing system is configured to repeat the selection of the beam for uplink transmission during the subsequent time interval; and
    the transmitter is configured to repeat the transmission of at least another uplink signal using the selected beam during the subsequent time interval.

11. The apparatus of claim 9, wherein the plurality of beams comprises a plurality of antenna modules of the UE and wherein the processing system is configured to select the beam by at least selecting one of the plurality of antenna modules for the uplink transmission.

12. The apparatus of claim 9, wherein the transmission power of the previous time intervals comprises an effective isotropic radiated power (EIRP) of the previous time intervals in the time window.

13. The apparatus of claim 9, wherein the moving time window is a predetermined time window in a range from 1 second to 360 seconds and wherein the particular time interval is in a range from 1 millisecond to 5 seconds.

14. The apparatus of claim 9, wherein the processing system is configured to select the beam by at least:
    converting the transmission power for the prior time interval to a used RF exposure for the prior time interval for each of the plurality of beams;
    detecting an indication of the RF exposure for each of the plurality of beams;
    scaling the used RF exposure for the prior time interval for each of the plurality of beams using the detected indication of the RF exposure for each of the plurality of beams;
    adding the scaled RF exposure for the prior time interval for each of the plurality of beams to an accumulated RF exposure value for the time window for each of the plurality of beams to generate an accumulated sum for each of the plurality of beams;
    calculating a maximum allowed transmission power for the particular time interval for each of the plurality of beams based on the accumulated sum for each of the plurality of beams and a maximum RF exposure limit; and selecting the beam out of the plurality of the beams having the highest maximum allowed transmission power for the particular time interval as the beam for uplink transmission during the particular time interval.

15. The apparatus of claim 9, wherein the RF exposure comprises a specific absorption rate (SAR) or a power density (PD).

16. The apparatus of claim 9, wherein the plurality of beams comprises a plurality of combinations of antenna array elements of the UE and wherein the processing system is configured to select the beam by at least selecting one of the combinations of the antenna array elements for the uplink transmission.

17. An apparatus for wireless communication, comprising:

means for selecting, from a plurality of beams, a beam for uplink transmission during a particular time interval, the selecting being based on a transmission power and a radio frequency (RF) exposure for each of the plurality of beams, wherein the particular time interval is part of a moving time window and wherein the means for selecting is configured to select the beam based on the transmission power of previous time intervals in the time window and the RF exposure, for each of the plurality of beams, for a prior time interval in the time window; and means for transmitting at least one uplink signal using the selected beam during the particular time interval.

18. A non-transitory computer-readable medium having instructions stored thereon for:

selecting, from a plurality of beams, a beam for uplink transmission during a particular time interval, the selecting being based on a transmission power and a radio frequency (RF) exposure for each of the plurality of beams, wherein the particular time interval is part of a moving time window and wherein the selecting is based on the transmission power of previous time intervals in the time window and the RF exposure, for each of the plurality of beams, for a prior time interval in the time window; and transmitting at least one uplink signal using the selected beam during the particular time interval.

* * * * *